United States Patent [19]

England

[11] Patent Number: 5,768,351

[45] Date of Patent: Jun. 16, 1998

[54] METHOD AND APPARATUS FOR CONNECTING A TELEPHONE TO A VOICE CAPABLE MODEM

[75] Inventor: David G. England, Chandler, Ariz.

[73] Assignee: Intel Corporation, Santa Clara, Calif.

[21] Appl. No.: 831,578

[22] Filed: Apr. 9, 1997

Related U.S. Application Data

[63] Continuation of Ser. No. 571,161, Dec. 12, 1995, abandoned.

[51] Int. Cl.$^6$ .................................................. H04M 11/00
[52] U.S. Cl. ...................... 379/93.37; 379/405; 379/442
[58] Field of Search .............................. 379/93.01, 93.09, 379/93.26, 93.28, 93.37, 100.01, 100.15

[56] References Cited

U.S. PATENT DOCUMENTS

| | | |
|---|---|---|
| 5,444,770 | 8/1995 | Davis et al. . |
| 5,455,859 | 10/1995 | Gutzmer ................................ 379/442 |
| 5,463,616 | 10/1995 | Kruse et al. . |
| 5,473,676 | 12/1995 | Frick et al. ............................ 379/99 |

Primary Examiner—Wing F. Chan
Attorney, Agent, or Firm—Blakely, Sokoloff, Taylor & Zafman

[57] ABSTRACT

A circuit for providing an interface between a telephone set and a modem having voice processing capabilities that allows digitization of the voice to occur and provides an improved capability for the detection of a signal indicating a transfer from voice mode to data mode. A typical telephone interface consists of a '2 wire system' on which both the incoming and outgoing signals are carried simultaneously. These two signals need to be separated in order to digitize the outgoing signal. This is done using a hybrid transformer network that attempts to subtract the incoming signal from the outgoing signal. To switch from voice mode to data mode, it is necessary to 'listen' for the data tones while a voice call is in progress. These tones are sent by a remote modem as a signal for the local modem to switch into data mode. These tones may be received at a very low level which can prevent the tone detection circuitry from properly functioning. To address this situation, according to the invention, the local outgoing signal is extracted from the received tones by the use of a Data Access Arrangement (DAA) which includes a hybrid transformer. The modem now uses this received signal to detect the tones during a voice conversation.

9 Claims, 5 Drawing Sheets

METHOD AND APPARATUS FOR CONNECTING A TELEPHONE TO A VOICE CAPABLE MODEM

This is a continuation of application Ser. No. 08/571,161 filed Dec. 12, 1995, now abandoned.

BACKGROUND OF THE INVENTION

This invention relates to a method and apparatus for handling concurrent voice and non-voice communication between two remote sites. More particularly, this invention relates to full-duplex, concurrent voice/data communication over the public switched telephone network (PSTN). The invention is for use with a modem that has voice processing capabilities which interfaces to a standard analog telephone set.

Modems with voice processing capabilities process a voice signal in one of two modes. In one mode, the local voice signals are digitized and combined with standard modem data to be sent over a Public Switched Telephone Network (PSTN) to a remote modem with the same capabilities. On receiving this data, the receiving modem extracts the digitized voice portion and converts it to an analog signal which is sent to the telephone set. In the second mode, the analog voice signals are routed directly to the PSTN. For this second technique to operate, special signaling tones are sent by one modem when it needs to switch between a voice connection and a data connection. These tones must be recognized by the receiving modem by listening to the voice connection. In general, the first mode (i.e., digitizing voice signal prior to transmission) is used when users need to share computer data while talking to each other simultaneously and the second mode (i.e., routing the analog voice signals directly to the PSTN) is used when users need to transfer large amounts of data while keeping a voice communication open.

In U.S. Pat. No. 5,463,616 assigned to Advanced Protocol Systems, Inc., full-duplex, concurrent voice and non-voice communication over the public switched telephone network (PSTN) is maintained by a communication interface apparatus. A voice only connection is established between two sites initially. Concurrent voice/non-voice connection then is established by pressing an engage button on the communication interface apparatus at each site. Voice communication is temporarily lost, while the connection changes from a phone-to-phone voice-only link to an interface-to-interface voice/non-voice datalink. The communication interface apparatus includes a digital signal processor for converting and compressing digital voice data into a voice data packet, a modem for maintaining communication over the PSTN and a micro-controller for managing the establishment and maintenance of concurrent voice and non-voice data communication. However, there is no mechanism for automatically switching between voice and data communications.

In U.S. Pat. No. 5,444,770 assigned to Radish Communications, Systems, Inc., a telephone interface system is inserted between a telephone handset and a base telephone unit to provide automatic switching between voice and data modes of communication. The interface includes a modem having a receive port coupled to the telephone base speaker lines and a transmit port switchably coupled to the base microphone lines, a switch for selectively coupling the telephone handset to the base, and a processor for monitoring data received by the modem and controlling the switch to automatically decouple the telephone handset from the base when data is being received or transmitted by the modem. The modem includes a tone generator that generates a predetermined start signal to signal a remote unit at the other end of the communication link to enter data mode prior to transmission of data. Similarly, the modem includes a tone detector to detect a start signal sent by the remote unit that causes the unit to switch into data mode in preparation for receiving data. The start signal can also include signals designating the rate at which data will be transmitted and its format. A product implemented according to the teachings of this patent would require the use of an expensive, non-standard transformer component in order to extract the DTMF tones. Also, U.S. Pat. No. 5,444,770 does not allow for simultaneous voice and data transmission.

SUMMARY OF THE INVENTION

There are two problems that are addressed by this invention which exist in the prior art. The first involves the interface between the telephone set and the modem that will allow digitization of the voice to occur. The second involves the detection of a signal indicating a transfer from voice to data mode.

A typical telephone interface consists of a '2 wire system' on which both the incoming and outgoing signals are carried simultaneously. These two signals need to be separated in order to digitize the outgoing signal. This is done using a hybrid transformer network that attempts to subtract the incoming signal from the outgoing signal. This may be accomplished using a telephone hybrid circuit as shown in FIG. 1 in which a modem 11 with voice capability is coupled to a telephone 13 and the PSTN through a telephone hybrid circuit 15.

The second problem involves the 'listening' for the data tones while a voice call is in progress. These tones are sent by a remote modem as a signal for the local modem to switch into data mode. A problem which arises is that these tones may be received at a very low level. If a person at the local site is talking while these tones are being received, the outgoing voice signal may be at a much higher level than the incoming tones causing a largely negative signal-to-noise ratio relative to the incoming tones. In this case, the voice signal (as well as the undetected tones) is treated as 'noise' as far as the tone detection circuitry is concerned. To improve this situation, the circuit of FIG. 1 is further modified to that of FIG. 2 by adding a PSTN hybrid circuit. In the FIG. 2 approach, the local outgoing signal is extracted from the received tones by the use of a Data Access Arrangement (DAA) which includes a hybrid transformer. The modem now uses this received signal to detect the tones during a voice conversation.

DETAILED DESCRIPTION OF THE INVENTION

Figure 1:
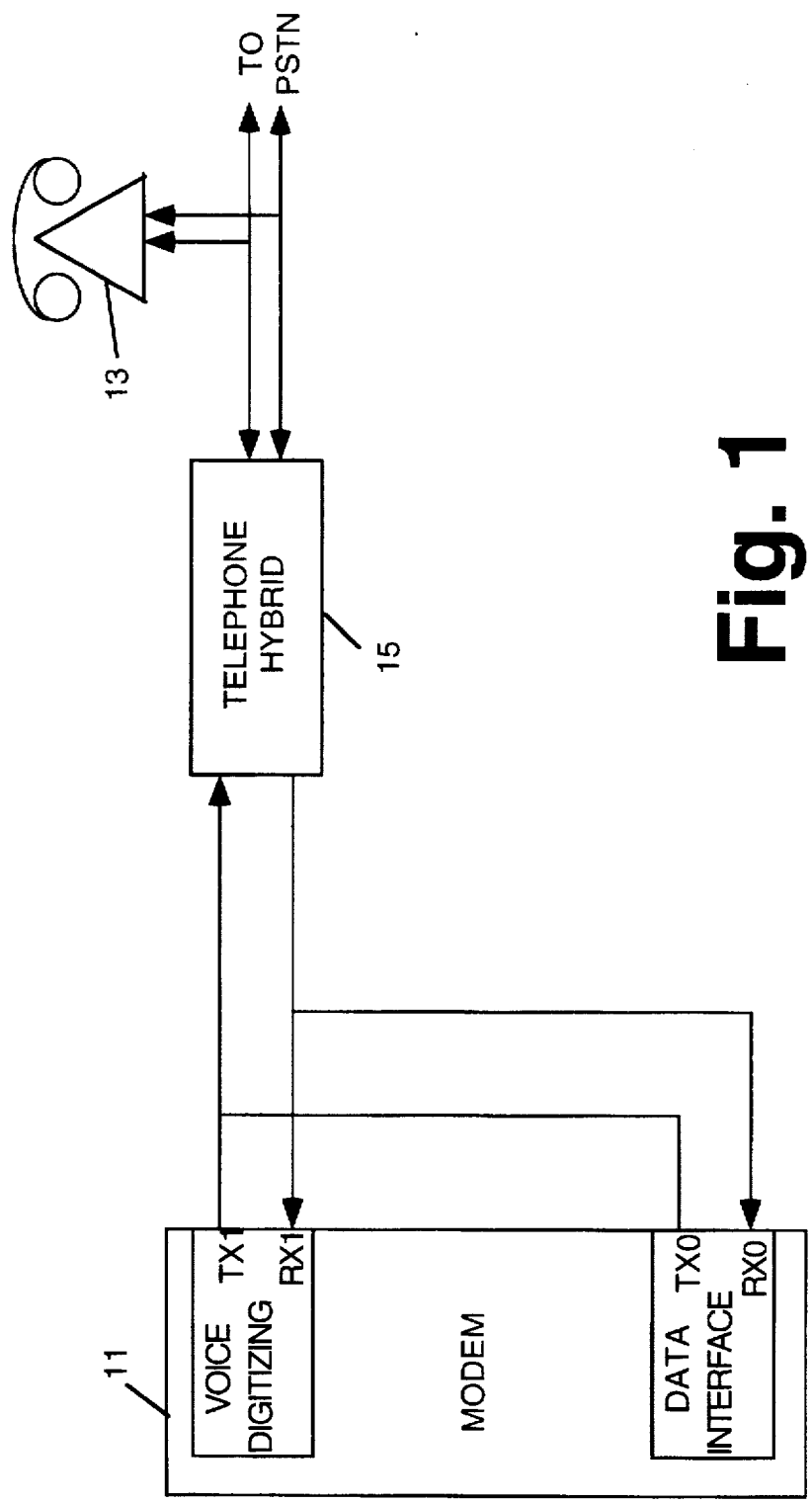
FIG. 1 is a block overview diagram showing the use of a telephone hybrid to connect a modem with voice capability to a PSTN.
Figure 2:
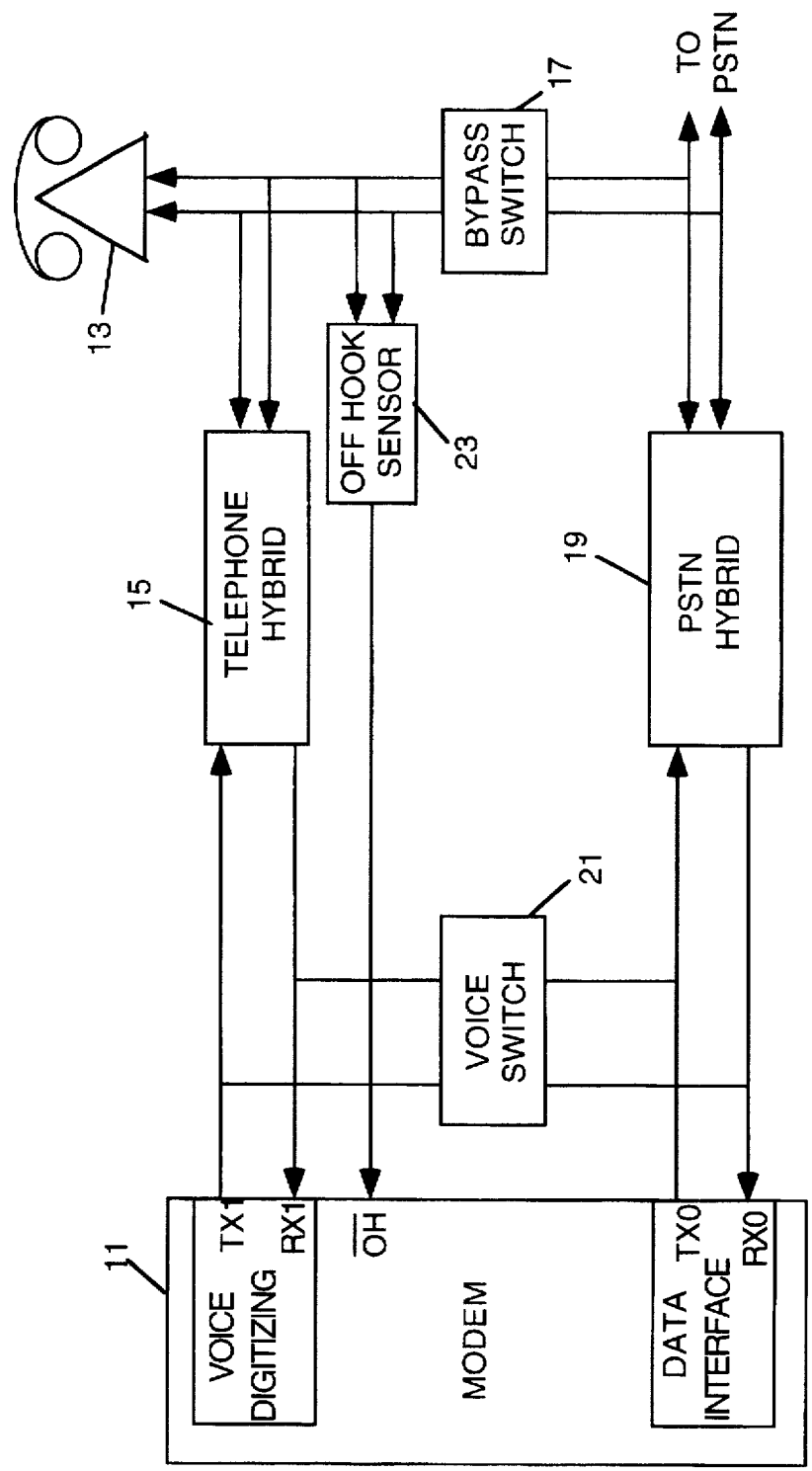
FIG. 2 is a block overview diagram showing the use of a telephone hybrid to connect a modem with voice capability to a PSTN according to the present invention.

The key elements of the invention are the connection of the two hybrid circuits as shown in FIG. 2 and their implementation.

The invention allows a normal voice call to be uninterrupted while the modem is listening for the special tones that signify a data switchover. In a normal modem connection, the telephone would be connected directly via relays to the PSTN line. In this invention, the same connection is available for the case when the modem is not processing voice data, or is powered off by closing a switch shown in FIG. 2 as bypass switch 17. When the modem is switched into the voice processing mode, the bypass switch is opened and the telephone hybrid 15 (also referred to as a voice hybrid) is connected to the PSTN hybrid 19 (also referred to as a DAA hybrid), subject to the state of voice switch 21 which is open during data communications and closed during voice communications. There is little or no effect on the voice signals between the telephone set and the PSTN when in voice mode. Also shown in FIG. 2 is off-hook sensor 23 which generates a signal for use by modem 11 when the handset of telephone 13 is off-hook. Off-hook sensor 23 is used to provide a signal which is input to modem 11 to indicate when the user has replaced the handset and so the modem knows whether the PSTN line is free for the modem to use to initiate a connection.

Modems with voice processing capabilities are a key element in today's communication systems. To allow these modems to interface to the existing PSTN, a system has been developed by Radish Communications Systems, Inc. known as its VoiceViews system that allows automatic switching between a voice telephone call to a data call as noted above. During operation of the VoiceViews system, a call is initiated by a person to another remote person. Whenever, one of them wants to share some data with the other (document transfer or use of a teleconferencing application such as ProShare™ available from Intel Corporation), the originator's modem will switch the telephone line to data mode and will transmit a Dual Mode Tone Frequency (DTMF) signal. The DTMF signal is simply two sinusoidal signals of equal amplitude but differing frequencies added together. The frequencies of the signals are set by the VoiceView protocol.

The remote modem is constantly listening to the voice conversation, waiting for a valid DTMF signal to appear. When it detects such a signal, a switch such as switch 21 will open causing the modems to operate in data mode. With the two modems in data mode, a data transfer can take place. At the end of the transmission the modems return the line to voice mode (telephones connected to the line).

While the system described above works in theory, in a two wire telephone system such as PSTN, there is a problem in detecting valid DTMF tones. This is because the DTMF signal is superimposed with the signal from the local user's telephone microphone. If the microphone signal is stronger than the DTMF signal (due to propagation losses on the telephone line), it is difficult to extract the DTMF signal (due to a negative Signal to Noise Ratio (SNR), with the microphone generated signal being the noise). The invention solves this problem with a circuit that improves the SNR of the DTMF signal to provide easier detection of the DTMF signal.

Figure 3:
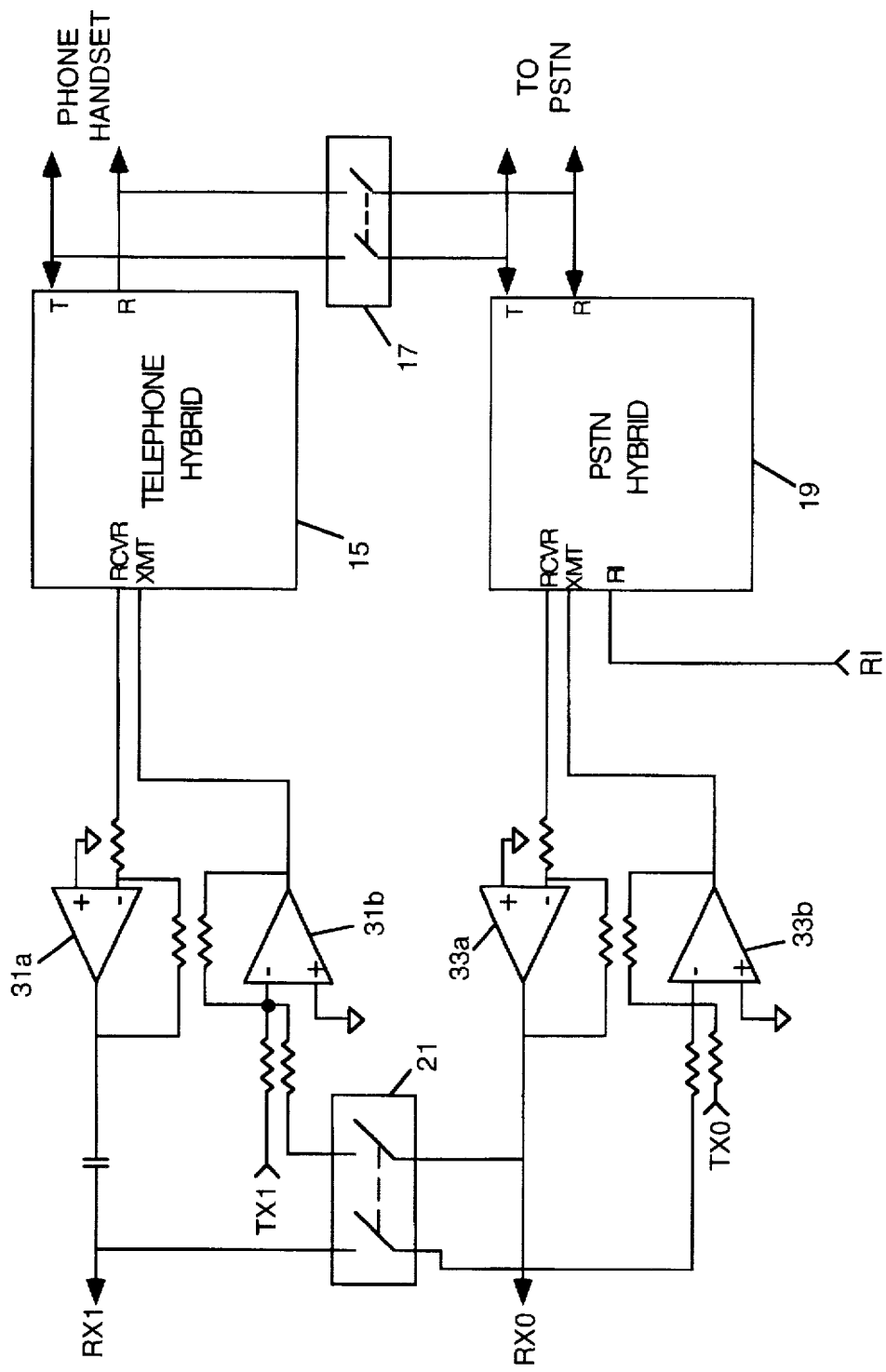
FIG. 3 is a circuit for connecting a modem with voice capability to a PSTN according to the present invention.

The concept, which is illustrated by the circuit shown in FIG. 2, was proven using a prototype circuit. In this prototype circuit as shown in FIG. 3, commercially available telephone hybrid and PSTN hybrid modules were used (part no. XE0002B available from Xircom). Differential amplifiers 31a and 31b handle the channel 1 transmit and receive signals by buffering them to the modem. Differential amplifier 31b combines the modem transmit signal with that from switch 21. However, when switch 21 is closed, the TX1 signal from the modem is not present since it is turned off by the modem based on signal AS1 (analog switch 1) generated by software in the modem. Thus, either the modem transmit signal (TX1) or the signal from switch 21 (RX0) is output to telephone hybrid 15. Differential amplifier 31a buffers the receive signal from telephone hybrid 15 before passing it to modem 11.

Differential amplifiers 33a and 33b handle the channel 2 transmit and receive signals by buffering them before passing them to modem 11. Differential amplifier 33b also acts in a similar as differential amplifier 31b as to the TX0 and RX1 signals. Voice switch 21 is a commercially available relay switch available from CP Clare, Inc. as its part no LQ52B00. Bypass switch 17 may be implemented using the same part. Bypass switch 17 is normally closed. The signal AS2 (analog switch 2) is asserted by software in the modem when the modem needs to gain access to the PSTN or the telephone. When asserted, AS2 causes bypass switch 17 to open. The specifics of the software needed to generate AS1 and AS2 should be apparent to persons skilled in the art based on this description and a modem having voice handling capabilities.

This prototype showed an improvement in the SNR ratio of the received DTMF signal (~10 dB). However, in the embodiment shown in FIG. 3 where the two hybrids are connected back to back, such configuration can cause self-oscillations to occur. Suitable filtering must be incorporated to prevent this from occurring.

Figure 4:
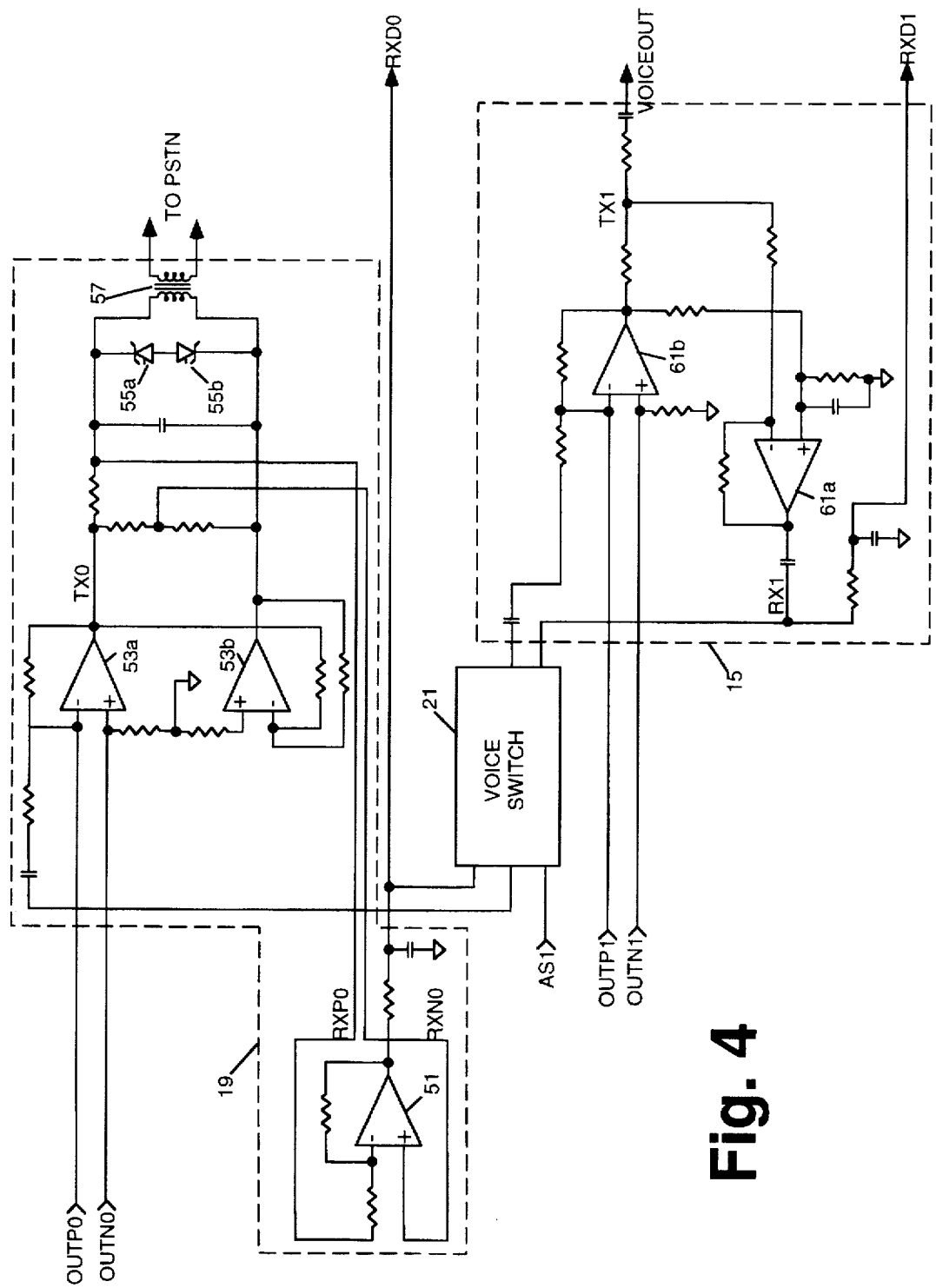
FIG. 4 is a circuit for connecting a modem with voice capability to a PSTN according to the preferred embodiment of the present invention.
Figure 5:
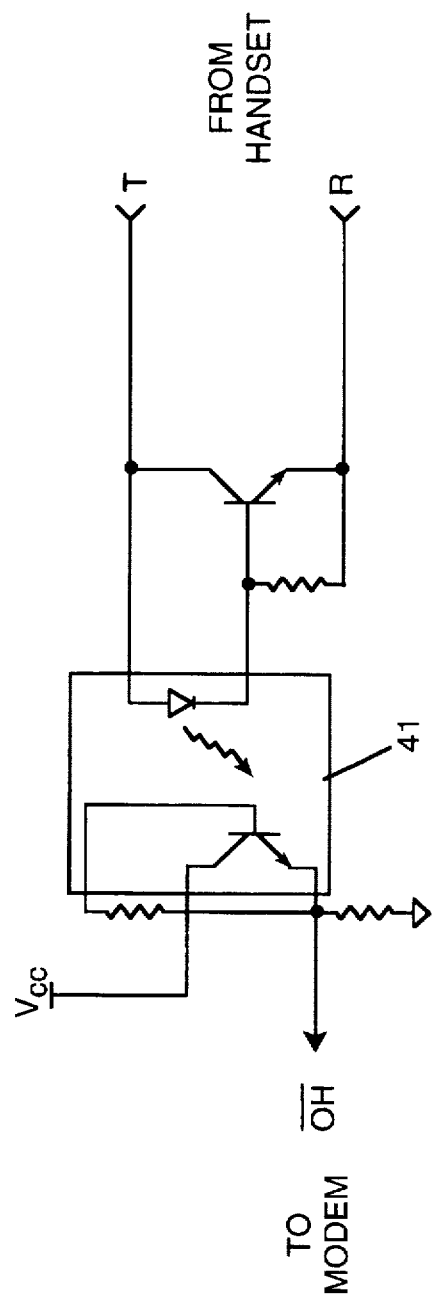
FIG. 5 is an off-hook detection circuit.

The circuit shown in FIG. 4 incorporates full functionality with filtering to limit self-oscillation. This design also allows for the digitizing of the local telephone signals for input into the modem. This digitized signal can be incorporated with a data stream and passed to through the telephone line to a remote modem. The remote modem extracts the signal from the data stream and passes it to the user's telephone (via digital to analog conversion, not shown) via the hybrid network. The circuit of FIG. 4 may incorporate an off-hook sensor 23 (see FIG. 2) which detects when the handset is off-hook and transmits a signal $\overline{OH}$ back to the modem indicating this state for the reasons noted above. FIG. 5 shows a suitable off-hook sensor which may be employed for this purpose using opto-isolator 41.

The two wire PSTN system is converted to a four wire system by the telephone hybrid and fed into the modem DAA where the four wires are converted back to a two wire system. The hybrids produce reflections of the transmitted signal that add to the receive signal in the four wire system. Ordinarily, this can cause an annoying feedback to the user. The PSTN hybrid's role is to minimize the transfer of energy from the transmit signal to the receive signal. This is done by extracting a portion of the transmit signal from the combined (transmit+receive) signal that is present in the two wire system. Due to variances in telephones and PSTN lines, it is impossible to remove all of the transmitted signal. But careful design as shown in FIG. 4 substantially overcomes these problems.

In FIG. 4, differential amplifier 51 receives a differential signal RXP0/RXN0 produced by differential amplifiers 53a and 53b using the signals OUTP0 and OUTN0 which correspond to signal TX0 of modem 11 shown in FIG. 2. These differential amplifiers along with zener diodes 55a and 55b and transformer 57 form PSTN hybrid driver 19. The differential amplifiers 53a and 53b buffer the signals from modem 11, which typically requires an impedance of 10 kOhms, to that of transformer 57, which typically is 600 Ohms. Zener diodes 55a and 55b are used to remove any large voltage spikes that can occur on a standard telephone line. Transformer 57 is used to isolate the hybrid circuitry from the PSTN line which frequently has high voltages associated with it which could damage the circuit if connected directly.

Voice switch 21, in effect, couples/decouples RX1 to TX1 and RX0 to TX0. During normal phone operation, the switch is closed and the couplings are made. However, upon receipt of a DTMF signal, the switch is opened as described above to enable data communications over RX0 and TX0. The signal AS1 is generated by software in the modem when the DTMF signal is detected. The switch is closed when a voice conversation is taking place and the modem is listening for DTMF tones.

Telephone hybrid circuit 15 uses differential amplifiers 61a and 61b as follows. Differential amplifier 61b receives OUTP1 and OUTN1 which are differential signals generated by the modem (equivalent to signal TX1 in FIG. 2).

The output of differential amplifier 61b is the signal TX1 which goes to the speaker in the telephone handset. Signal TX1 is a combined signal equal to the output of amplifier 61b plus the microphone signal from the telephone handset. Differential amplifier 61a subtracts a portion of the output of amplifier 61b from this combined signal to generate signal RX1 which is mostly the microphone signal. Differential amplifier 61b either outputs the signal from the modem or the signal from the PSTN line via switch 21 and amplifier 51.

Although the invention has been described with reference to a particular circuit implementation, various modifications which would be apparent to persons skilled in the art without departing from the invention as defined in the following claims.

I claim:

1. A circuit for connecting a public switched telephone network (PSTN) to a modem having voice processing capabilities comprising:
   a) a telephone hybrid means for producing from a two line telephone system which carries transmitted signals and received signals on said two lines, a separate set of voice signals corresponding to said transmitted signals and said received signals;
   b) a PSTN hybrid means for producing from a two line telephone system which carries transmitted signals and received signals on said two lines, a separate set of data signals corresponding to said transmitted signals and said received signals;
   c) coupling means for selectively and automatically coupling said telephone hybrid means to said PSTN upon receipt of a predetermined data signal.

2. The circuit defined by claim 1 wherein said telephone hybrid means comprises:
   a) a first differential amplifier having as its inputs a differential signal representing a transmit signal generated by said modem and having an output for coupling to a speaker of a telephone handset and coupled to said coupling means;
   b) a second differential amplifier having as its inputs the output from said first differential amplifier means and having an output coupled to said modem and coupled to said coupling means.

3. The circuit defined by claim 1 wherein said PSTN hybrid means comprises:
   a) a first differential amplifier having as its inputs a differential signal produced by second and third differential amplifiers;
   b) said second differential amplifier having as its inputs a differential signal representing a transmit signal generated by said modem and having an output coupled to said coupling means and a transformer;
   c) said third differential amplifier having its output coupled to said transformer;
   d) said transformer for coupling to said PSTN.

4. The circuit defined by claim 3 further comprising a pair of zener diodes coupled in series to each other and in parallel to said transformer.

5. The circuit defined by claim 1 wherein said coupling means comprises a switch which couples and decouples receive and transmit signal pairs of said modem such that during a voice telephone operation, said receive and transmit pairs are coupled to each other and during data operations said receive and transmit signal pairs of said modem are decoupled from each other.

6. The circuit defined by claim 1 further comprising off-hook sensor means for detecting whether a handset of a telephone is on-hook or off-hook and generating a signal for use by said modem indicating the on-hook/off-hook status of said handset.

7. A circuit defined by claim 6 wherein said off-hook sensor means comprises an opto-isolator coupled to said modem.

8. The circuit defined by claim 1 further comprising by-pass switch means for coupling and decoupling a telephone from said PSTN.

9. The circuit defined by claim 8 wherein said bypass switch means comprises a relay switch.

* * * * *